Patented Nov. 17, 1942

2,302,361

UNITED STATES PATENT OFFICE 2,302,361

FILLER FOR VINYL RESIN PLASTICS

Victor Yngve, Lakewood, Ohio, assignor to Carbide and Carbon Chemicals Corporation, a corporation of New York No Drawing. Application April 15, 1938, Serial No. 202,216

7 Claims. (Cl. 260—41)

The invention relates to vinyl resin plastic compositions, and is particularly concerned with modified filler materials, including methods for treating certain fillers to improve their value as components of vinyl resin plastics.

While the normal function of filler materials is of value in plastic compositions compounded from vinyl resins, the inherent nature of these resins is such as to limit greatly the field of usefulness of many filler substances in plastic compositions containing them. Considerable variation in physical properties is encountered in common filler materials, and many of them have been found to contain, either as impurities or in their essential composition, substances which are distinctly deleterious to vinyl resins and which will actually promote decomposition of the resin when the filler is incorporated therewith. Iron and iron compounds, constituting the predominating constituent of rouge and other iron oxide pigments and fillers, are particularly objectionable in this respect, and these substances are also commonly found as impurities in many grades of asbestos fiber and talc fillers. Zinc base pigments and filler materials likewise often destroy resin stability. The present invention is especially concerned with the treatment of these types of filler materials, which contain iron, zinc, or other substances exerting a poisonous effect on vinyl resins.

Vinyl resin plastics particularly improved by these treated filler materials are those of the type which contain such resins as may result from the conjoint polymerization of a vinyl halide with a vinyl ester of a lower aliphatic acid, such as are described in U. S. Patent No. 1,935,577 to E. W. Reid. A preferred embodiment of the invention is, therefore, directed to plastics essentially composed of these resins, and compositions containing resins which may be formed by the conjoint polymerization of vinyl chloride with vinyl acetate and which contain in the polymer from 60% to 95% by weight of vinyl chloride are especially preferred in the practice of the invention.

It is an object of the invention to provide methods of treating filler materials to render innocuous those substances contained therein which are deleterious in their action toward vinyl resins. A further object is to improve the usefulness in vinyl resins of fillers containing iron, zinc, or compounds thereof, and thereby also to provide vinyl resin plastics including such fillers which show substantially improved stability.

In accordance with my invention the filler substance is treated prior to incorporating it with the vinyl resin by thoroughly mixing the filler particles with an aqueous solution of a compound adapted to react with or coat the poisonous substances therein in a manner which will render them inert and incapable of exerting any decomposing action on the resin. Compounds suitable for this pre-treatment can be divided into two general classes, and they include either basic materials, or substances which will react with metals, such as iron or zinc, to produce compounds substantially insoluble in the common vinyl resin solvents. With materials of basic nature there is effected in this manner an alkali concentration on the face or surface of the filler particle, and by the second treatment an inert compound is formed of the poisonous elements of the filler. In either instance the treated and dried filler material per se exerts little or no deleterious action on the vinyl resin when compounded therewith.

Among a large number of treating compounds which have been tested in this manner, those preferred consist of either a soluble inorganic base or a salt formed from a strong base and a weak acid. Sodium compounds, including sodium hydroxide, sodium perborate, sodium silicate, sodium carbonate, sodium acetate, sodium bichromate, sodium thiosulphate, and trisodium and disodium phosphates, have proved to be especially effective. Similar derivatives of potassium, calcium, barium, magnesium or strontium can also be used where these latter compounds are water-soluble. Some of these, for example trisodium phosphate, will be found to exert both of the actions above described, and will form relatively insoluble iron compounds coexistent with their basic reaction.

A selection of the most suitable treating compound, and the amount which it may be necessary to use, will be influenced by the character and properties of the particular filler to be treated, as well as the heating and other conditions which may be employed in processing a plastic incorporating the filler. The preferred compounds and their amounts can, however, be readily arrived at by one skilled in the art, and can be varied to suit the results required. Less than 1% by weight of the treating compound will, with certain iron oxide fillers, appreciably improve the stability of resins with which they are compounded, and in some instances increasing this to 5% has shown a five-fold improvement under similar test conditions.

The following examples are representative of numerous experiments which have been made, and they will illustrate the advantages of the invention:

*Example 1*

An iron oxide pigment in an amount of 150 grams was treated with 7.5 grams of trisodium phosphate dissolved in enough water to make a thick paste with the filler. The mixture was heated at about 100° C. for two hours with stirring, and the excess water was then evaporated. The dried, treated filler was powdered and milled into a vinyl resin of the type formed by conjoint polymerization of vinyl chloride with vinyl acetate which contained about 85% by weight of vinyl chloride in the polymer. The resulting plastic mix was subjected to heating at a temperature of 135° C., and it showed no appreciable decomposition after a period of more than ten hours. By comparison a similar mix employing untreated iron oxide showed a heat stability at the same temperature of only two hours.

*Example 2*

Following a substantially similar procedure, vinyl resin lacquers having excellent film stability were prepared from typical pigments, such as zinc oxide, Prussian Blue, French ochre, and red iron oxide. Preliminary treatment was effected with 5% water solutions of both sodium hydroxide and trisodium phosphate. After thorough mixing, and evaporation of the remaining water, the pigments and a plasticizer were ground on a differential two-roll mill with a vinyl resin similar to that described in Example 1. Lacquer compositions of these mixtures were formed by dispersing them in appropriate solvents, and films deposited from the lacquers were baked at a temperature of 350° F. until a visible decomposition had taken place. In each instance the time during which the films resisted darkening was considerably longer than the time with films from compositions which were identical in all respects but which contained the pigment in untreated form. For example, film containing untreated iron oxide turned black after thirty minutes of heating, whereas one in which the pigment was treated with trisodium phosphate withstood 160 minutes of heating before darkening. A similar film in which the pigment was iron oxide treated with sodium hydroxide blackened in 120 minutes. Similar comparisons of films pigmented with French ochre showed 30 minutes stability for the film containing the untreated pigment, 70 minutes stability for that containing the pigment treated with sodium hydroxide, and a stability of 120 minutes for the film in which the pigment was treated with trisodium phosphate.

Many modifications in the filler treatment other that those above described will be evident, and such modifications are included within the scope of the invention. Fillers in their broadest sense, and as referred to in the claims, will include pigmenting materials and other substances, wherein metals and metallic compounds poisonous to vinyl resins are present, either as impurities or in the essential composition of the filler; and paints, lacquers and the like, as well as molding and calendering compositions, are included within the broad term plastics used herein.

I claim:

1. A plastic composition composed essentially of a vinyl resin which is a conjoint polymer of a vinyl halide with a vinyl ester of a lower aliphatic acid, together with a particulate filler material including a substance containing a member of the group consisting of iron and zinc, which filler material normally has a deleterious effect upon the chemical stability of said vinyl resin, the particles of said filler carrying a dried alkaline protective coating in sufficient amount to prevent deleterious effect upon the resin due to the presence of said filler, said coating being formed on the particles prior to their incorporation in the resin by volatilizing the water from an intimate mixture of the uncoated particles and an aqueous solution containing a member of the group consisting of a non-volatile inorganic base and a basic salt of a weak acid and a strong base.

2. A plastic composition composed essentially of a vinyl resin which is a conjoint polymer of vinyl chloride with vinyl acetate, together with a particulate filler material including a substance containing a member of the group consisting of iron and zinc, which filler material normally has a deleterious effect upon the chemical stability of said vinyl resin, the particles of said filler carrying a dried alkaline protective coating in sufficient amount to prevent deleterious effect upon the resin due to the presence of said filler, said coating being formed on the particles prior to their incorporation in the resin by volatilizing the water from an intimate mixture of the uncoated particles and an aqueous solution containing a member of the group consisting of a non-volatile inorganic base and a basic salt of a weak acid and a strong base.

3. A plastic composition composed essentially of a vinyl resin which is a conjoint polymer of vinyl chlorine with vinyl acetate and having about 80% to 90% vinyl chloride in the conjoint polymer, together with a particulate filler material including a substance containing a member of the group consisting of iron and zinc, which filler material normally has a deleterious effect upon the chemical stability of said vinyl resin, the particles of said filler carrying a dried alkaline protective coating in sufficient amount to prevent deleterious effect upon the resin due to the presence of said filler, said coating being formed on the particles prior to their incorporation in the resin by volatilizing the water from an intimate mixture of the uncoated particles and an aqueous solution of sodium hydroxide.

4. A plastic composition composed essentially of a vinyl resin which is a conjoint polymer of vinyl chloride with vinyl acetate and having about 80% to 90% vinyl chloride in the conjoint polymer, together with a particulate filler material including a substance containing a member of the group consisting of iron and zinc, which filler material normally has a deleterious effect upon the chemical stability of said vinyl resin, the particles of said filler carrying a dried alkaline protective coating in sufficient amount to prevent deleterious effect upon the resin due to the presence of said filler, said coating being formed on the particles prior to their incorporation in the resin by volatilizing the water from an intimate mixture of the uncoated particles and an aqueous solution of trisodium phosphate.

5. A plastic composition composed essentially of a vinyl resin which is a conjoint polymer of vinyl chloride with vinyl acetate and having about 80% to 90% vinyl chloride in the conjoint polymer, together with a particulate filler material containing iron oxide, which filler material normally has a deleterious effect upon the chemical stability of said vinyl resin, the particles of said filler carrying a dried alkaline protective coating in sufficient amount to prevent deleterious effect upon the resin due to the presence of said filler, said coating being formed on the particles prior to their incorporation in the resin by volatilizing the water from an intimate mixture of the uncoated particles and an aqueous solution of trisodium phosphate.

6. A plastic composition composed essentially of a vinyl resin which is a conjoint polymer of vinyl chloride with vinyl acetate and having about 80% to 90% vinyl chloride in the conjoint polymer, together with a particulate filler material containing iron oxide, which filler material normally has a deleterious effect upon the chemical stability of said vinyl resin, the particles of said filler carrying a dried alkaline protective coating in sufficient amount to prevent deleterious effect upon the resin due to the presence of said filler, said coating being formed on the particles prior to their incorporation in the resin by volatilizing the water from an intimate mixture of the uncoated particles and an aqueous solution of sodium hydroxide.

7. A plastic composition composed essentially of a vinyl resin which is a conjoint polymer of vinyl chloride with vinyl acetate and having about 80% to 90% vinyl chloride in the conjoint polymer, together with a particulate filler material containing zinc oxide, which filler material normally has a deleterious effect upon the chemical stability of said vinyl resin, the particles of said filler carrying a dried alkaline protective coating in sufficient amount to prevent deleterious effect upon the resin due to the presence of said filler, said coating being formed on the particles prior to their incorporation in the resin by volatilizing the water from an intimate mixture of the uncoated particles and an aqueous solution of trisodium phosphate.

VICTOR YNGVE.